US011981105B2

(12) United States Patent
Kaslik

(10) Patent No.: US 11,981,105 B2
(45) Date of Patent: May 14, 2024

(54) DEVICE FOR TRANSFORMING PAPER IN REAL TIME

(71) Applicant: James Kaslik, Tempe, AZ (US)

(72) Inventor: James Kaslik, Tempe, AZ (US)

( * ) Notice: Subject to any disclaimer, the term of this patent is extended or adjusted under 35 U.S.C. 154(b) by 573 days.

(21) Appl. No.: 17/301,669

(22) Filed: Apr. 9, 2021

(65) Prior Publication Data

US 2022/0324193 A1 Oct. 13, 2022

(51) Int. Cl.

*A47K 7/00* (2006.01)
*A47K 7/02* (2006.01)
*A47K 7/08* (2006.01)
*A47K 10/16* (2006.01)
*B31F 1/07* (2006.01)

(52) U.S. Cl.

CPC .................. *B31F 1/07* (2013.01); *A47K 7/02* (2013.01); *A47K 7/08* (2013.01); *A47K 10/16* (2013.01); *B31F 2201/0705* (2013.01); *B31F 2201/0784* (2013.01)

(58) Field of Classification Search

CPC . A47K 7/00; A47K 10/00; A47K 5/14; A47K 7/08

See application file for complete search history.

(56) References Cited

U.S. PATENT DOCUMENTS

2017/0007078 A1* 1/2017 Lopez .................... A46B 9/026
2019/0150676 A1* 5/2019 Pasco .................... A47K 3/001

* cited by examiner

*Primary Examiner* — Michael D Jennings

(74) *Attorney, Agent, or Firm* — Lambert Shortell & Connaughton; David J. Connaughton, Jr.; Justin P. Tinger

(57) ABSTRACT

The device assists the customer in cleaning residue from their skin and body hair after they use a toilet for elimination, after they receive a cut or abrasion, or from other source. With the device, the person physically transforms toilet paper and other tissue-like paper in real time to have greater texture, density, and wetness, all three of which together facilitate cleaning better than dry paper or than wet paper without such increased density and texture. Being pocket sized and intended for repeated use, the device can be easily carried by or on the person and used in any bathroom or location anywhere without modification to the plumbing facilities, without risk of running out of a supply of pre-moistened wipes, and without damaging the environment or sewage and septic systems.

19 Claims, 6 Drawing Sheets

DEVICE FOR TRANSFORMING PAPER IN REAL TIME

CROSS-REFERENCES TO RELATED APPLICATIONS

This application claims the benefit of priority to U.S. provisional application having Ser. No. 63/063,413 filed on Aug. 9, 2020 by James A Kaslik, Cloud Hidden Designs, LLC. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND

One constant of human existence is the need for bathroom facilities with toilet fixtures through which humans undertake bodily functions including defecation, urination, and menstruation. Subsequent to completing that function, modern hygiene standards require cleaning oneself to keep one's skin and localized body hair clean and hygienic, keep one's undergarments and clothing clean and hygienic, and not spread undesirable germs, bacteria, and odors.

Likewise, there may be a need to clean the site of a cut or abrasion to the skin, such as to remove dirt, debris, blood, and other residue, particularly at times or in locations where no sanitary facilities are available or convenient. The discussion herein of "residue" is meant to include this manner of material on the skin, or other foreign substances, in addition to the products of elimination.

To clean oneself, people have attempted a variety of methods, including wiping residue with toilet paper, wetting toilet paper before wiping, directing water at residue, and wiping residue with disposable pre-moistened wipes made of a non-woven fabric. Such attempted solutions have not sufficiently addressed the needs of the industry, whether by being too flimsy to sufficiently remove all residue, by smearing or further spreading the residue they intend to remove, by requiring modification to plumbing or plumbing fixtures, by containing single-use plastics such as polyester and polypropylene and releasing micro plastics into the environment, by being a source of septic system and sewer clogs and thus directly causing expensive repair bills and contributing to the degradation of the environment, or by other problem.

Thus, there is still a need in the art for devices that enable hygiene that effectively cleans residue from one's body and localized body hairs, thoroughly cleans residue without smearing it, can be used in any bathroom—public or private—at any time and in any location, do not require modifying plumbing, do not require repeated repurchase, and are not harmful to septic systems, sewage systems, or the environment.

SUMMARY OF THE DEVICE

The device pertains to transforming toilet tissue paper in real time. More specifically, the device pertains to transforming paper's texture, density, and wetness in real time to improve its effectiveness at cleaning residue off human skin and body hair after elimination, after a cut or abrasion, or from other source of residue.

The present device enables a person to clean any residue left on their body after using a toilet for any elimination purpose, after receiving a cut or abrasion, or from other source, by simultaneously transforming in real time the texture, density, and moisture content of the paper a person uses to wipe away the residue. The device is pocket sized so that it can be carried with the person wherever they go. The device exists and performs independent of any other bathroom fixture, including the toilet, toilet tank, plumbing, or paper dispenser.

To effect the transformation of the paper by the device in real time on an as-needed basis requires liquid, a mold, and pressure. The liquid, which may be tap water, is retained in a sponge until released by pressure from a human hand pressing dry paper onto the mold formed by a coarse mesh bottomed by the compressed sponge.

With that pressure, the liquid released from the sponge is absorbed by the paper through the holes of the coarse mesh, with the volume of wetted paper forced into the mold under pressure creating a multiplicity of dense, substantial, differentiated, and distinct nubs on the paper. The pressure of paper onto the mold formed by the coarse mesh and sponge, which may vary based on the quality of the paper being transformed and other factors, must be sufficient to deform the paper such that it may compress into and fill the mold to achieve an increased density of the paper in the shape of the mold and substantially holds its form when wiped on skin or a surface.

The quality of the transformation enabled by the device is affected by the size of the coarse mesh mold being sufficient to form nubs substantial in size and quantity as well as density, and may be aided by the sponge and coarse mesh being encased in a container that restricts escaping liquid so as to direct released liquid primarily through the coarse mesh.

The transformation enabled by the device is conducted in real time, when and where the need arises and according to the perceived need. The thusly transformed paper, wiped on the skin, body hairs, and surfaces, provides superior cleaning by virtue of its newly acquired texture, density, and wetness, and is more effective at the task than paper without these three properties. The transformed paper decomposes in water in a manner and at a rate substantially the same as used, untransformed paper, such that there is no differentiated detriment to sewage and septic systems.

Variations that increase the value of the device provide a cavity into which to add liquid to refill the sponge, such as with a concave depression in the sponge or with a lip on the opening of the container. Other variations provide a flexible container encasing the sponge and coarse mesh, which itself may be encased in a rigid or semi-rigid case. Other variations allow the device to be transported and used in any orientation, including upside down, without spilling liquid. Other variations provide a rigid plate beneath the sponge for facilitating greater pressure with a flexible container. Other variations provide the coarse mesh to be a mat, which may be contoured and which may be independent of, attached to, or integrated with the sponge, wholly within the container, or to be an insert which fits into the opening of the container and provides a coarse mesh as its bottom surface in proximity to the sponge. Other variations provide for a plurality of compartments in the container to accommodate a plurality of liquids.

DETAILED DESCRIPTION

Figure 1:
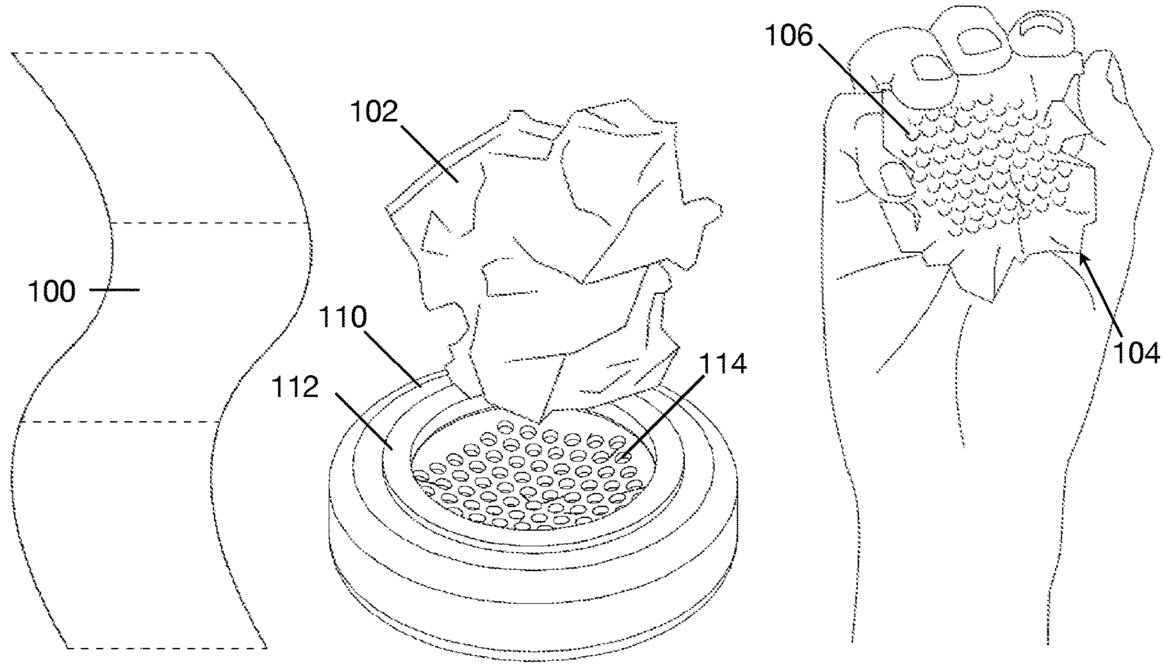
FIG. 1 schematically depicts the pocket-sized paper-transforming device according to one embodiment of the present disclosure, including paper prior to, during, and after transformation.

It should be understood that the description and drawings herein are merely illustrative and that various modifications and changes can be made in the structures disclosed without departing from the scope of the appended claims. It will also be appreciated that the various identified components of the exemplary paper-transforming device disclosed herein are merely terms of art that may vary from one manufacturer to another and should not be deemed to limit the present disclosure.

The present device facilitates a person cleaning any residue left on their body after using a toilet for any elimination purpose, after receiving a cut or abrasion, or from another source, may be reusable indefinitely, and may be pocket sized so that it can be carried with the person wherever they go. The device's pocket size additionally enables it to be individualized, such that each customer may have a device configured to their needs and tastes, and touched only by them to limit spread of germs. The customer is generally provided with the device which they may use with any or every visit to a bathroom or other location, adds their own water from a faucet, bottle, or other source intermittently as needed, or other cleansing or therapeutic liquid, and uses it with the supply of toilet paper 100 or other tissue-like paper existing at that location or which they separately provide, which the device transforms in real time, based on the present needs of the customer, into a superior configuration for removing the residue. The transformed paper 104 has greater texture, density, and wetness than the paper in its normal state, including greater densified texture than that of manufactured "textured" toilet paper, and greater texture and density than manufactured pre-moistened bathroom wipes and toilet paper that is merely wetted, with the real-time transformations working in concert to create a sturdier wiping product and effect improved hygiene.

The device is a waterproof container 110, 140, 154 that may be rigid, semi-rigid, or flexible, encasing a sponge 118, 128 or sponge-like material topped by a coarse mesh mold 122, 124, 138. The container has an access opening 150 in the top and an optional lid 152. The customer will intermittently add liquid through the opening 150 until the sponge-like material 118, 128 is moist throughout, but typically not saturated, and the material becomes progressively less moist with each of multiple uses of the device until the customer again adds liquid. They may close the optional lid 152 when the device is not in use or is being transported to prevent evaporation or leakage via accidental contact with foreign objects.

After the person uses the toilet for the elimination activity, they'll typically first wipe as they normally would with dry toilet paper to remove residue as they are able, though this may be skipped at the customer's discretion. Then they may crumple typically three-to-five sheets of paper 100 into a loose ball 102, and press it with their fingers through the opening 150 of the device against the coarse mesh mold 122, 124, 138 onto the sponge 118, 128. With that brief press, from one-half to two seconds in length on average, the paper, as it's being pressed into the holes, will absorb a small amount of liquid through capillary action, and the pressure from pushing the paper against the coarse mesh with sufficient applied force to deform the sponge and release the liquid will immediately and simultaneously impart both substantial distinct texture 106 (via the mold) and density (via the pressure) onto the now-wetted paper 104. The texture, density, and wetness simultaneously enabled by the device make the transformed paper 104, 106 more effective at wiping away the residual residue than paper without such texture, density, and wetness, and specifically more effective and sturdier than paper which is dry or merely wetted. The areas that may be wiped include the anus, buttocks, and perineum, including both skin and hair, the upper thighs, the vulva and pubic hair, and any other part of the body that may benefit from cleaning, which is enabled by the densified texture imparted to the paper. Additional areas that may benefit from cleaning with the transformed paper 104, 106 include fixtures such as the toilet seat, toilet tank flushing handle (or lever or button or knob), door knob, and faucet. After being used to wipe away residue, the transformed paper is then disposed of in the typical fashion, where it will decompose in much the same fashion as untransformed paper.

This configuration offers significant improvement by allowing transformation and use of a wide variety of papers. The term "paper" refers to any of the class of paper products defined as "tissue" by weight, which as an industry term are those of low weight, generally <40 g/m$^2$ (grams per square meter). This includes toilet paper 100, facial tissue, paper towels, and more. There can be a big variation in the quality of paper provided at a toilet location, from 3-ply plush in a home to 1-ply basic in a commercial building or portable potty. This device may transform all such paper in real time with increased texture, density, and wetness to enable its use for effective cleaning of the person directly, plus the additional surfaces of the facility into which the person may come in contact.

Figure 6:
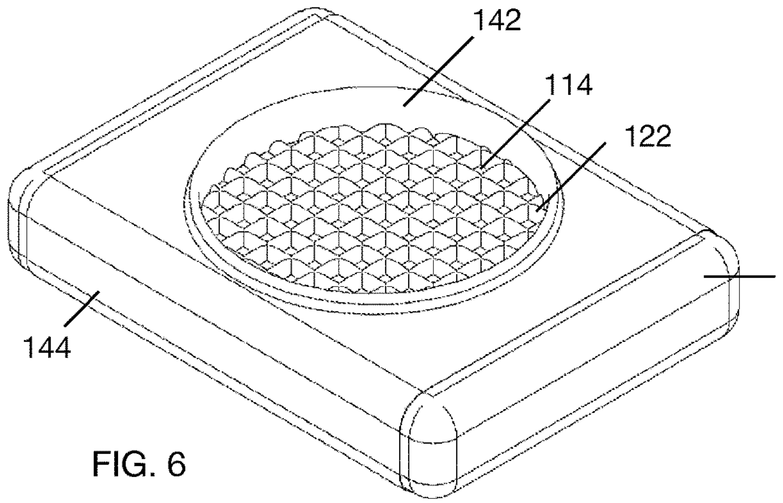
FIG. 6 is a front perspective view of paper-transforming device according to another embodiment of the present disclosure.
Figure 7:
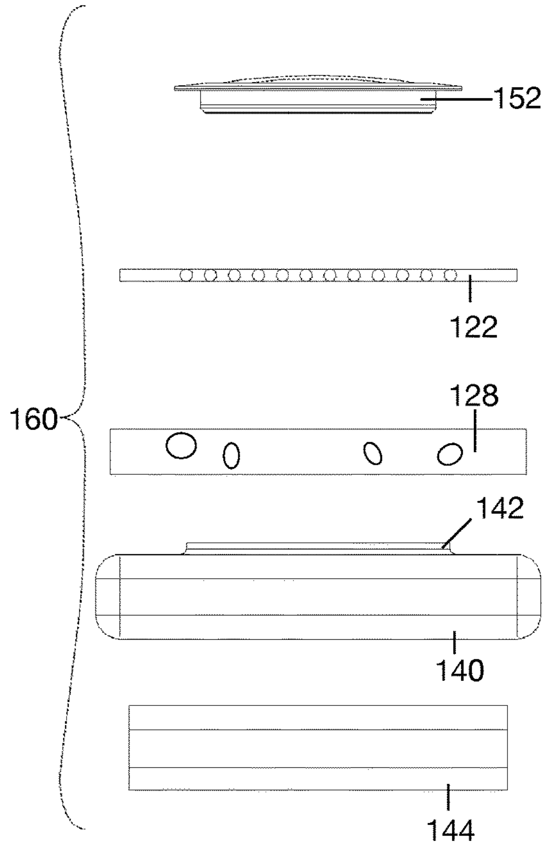
FIG. 7 is a front exploded view of the device of FIG. 6.
Figure 8:
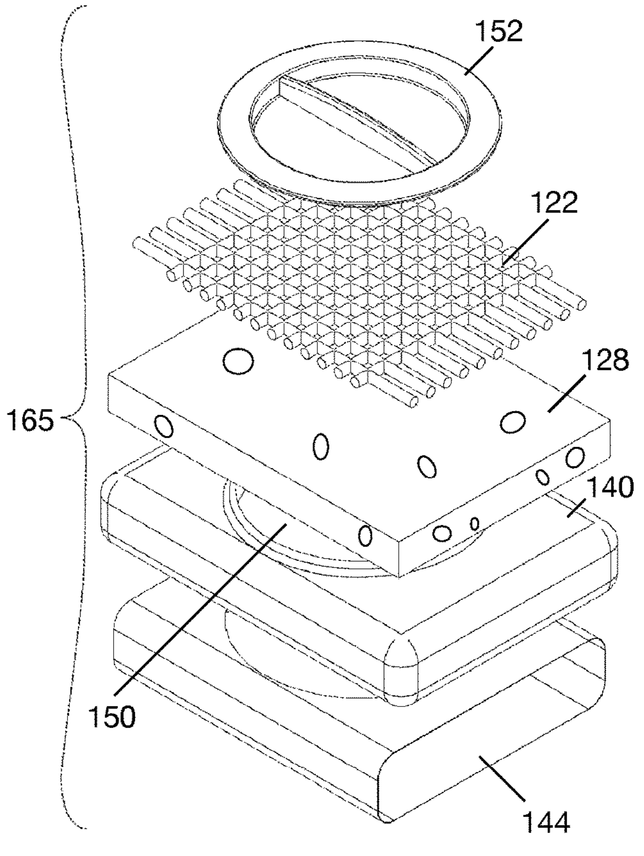
FIG. 8 is a front perspective exploded view of the device of FIG. 6.
Figure 9:
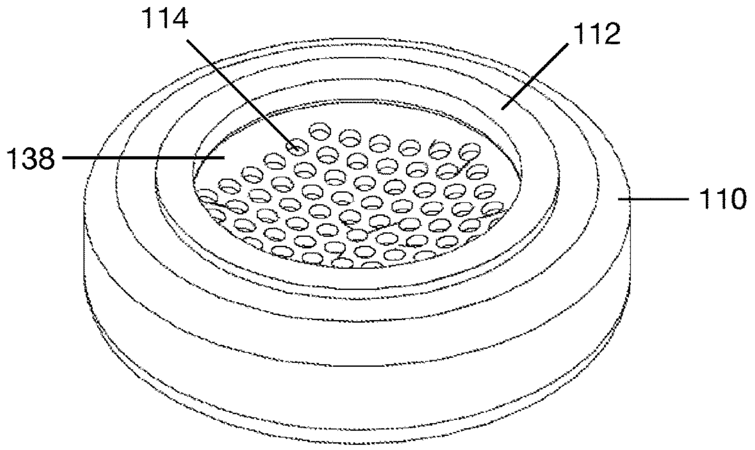
FIG. 9 is a front perspective view of the device of FIG. 1.
Figure 10:
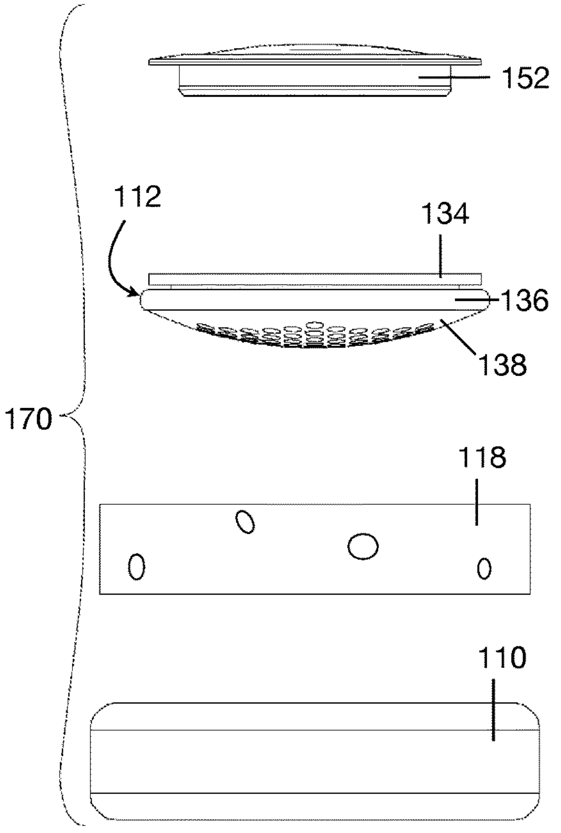
FIG. 10 is a front exploded view of the device of FIG. 9.
Figure 11:
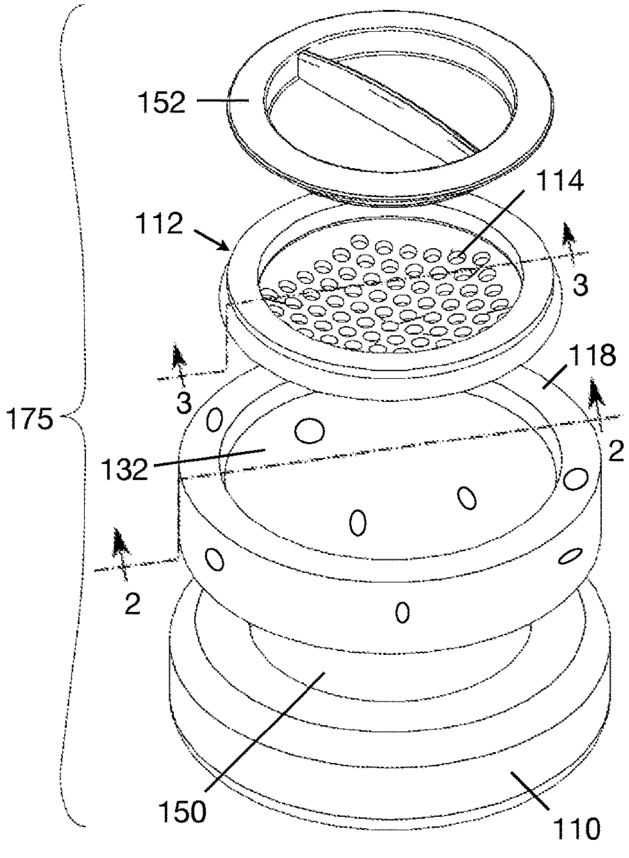
FIG. 11 is a front perspective exploded view of the device of FIG. 9.
Figure 12:
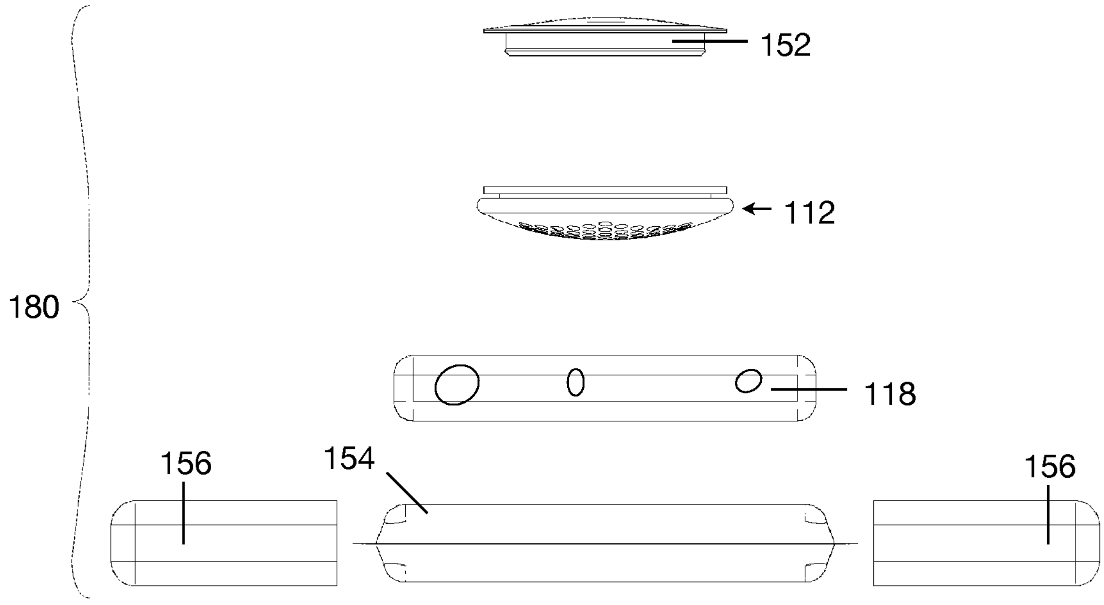
FIG. 12 is a front perspective view of paper-transforming device according to another embodiment of the present disclosure.
Figure 13:
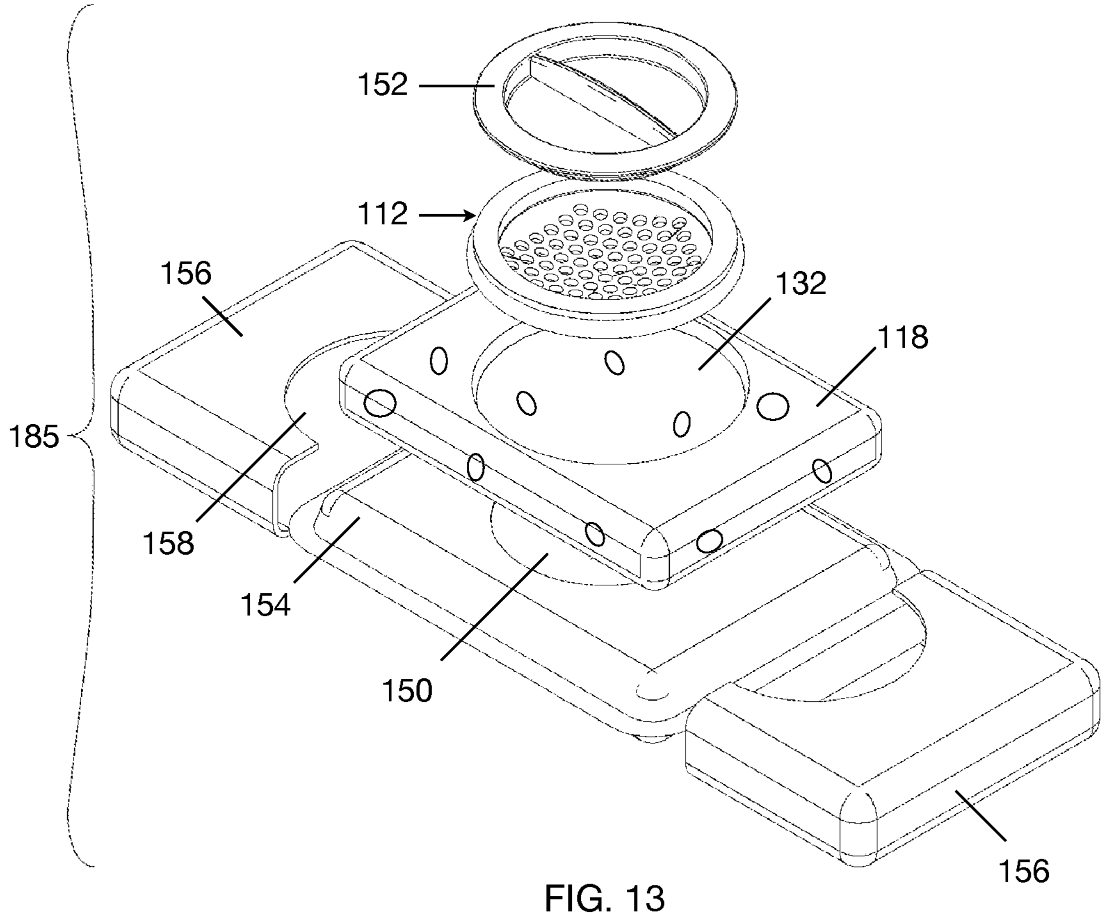
FIG. 13 is a front perspective exploded view of the device of FIG. 12.
Figure 14:
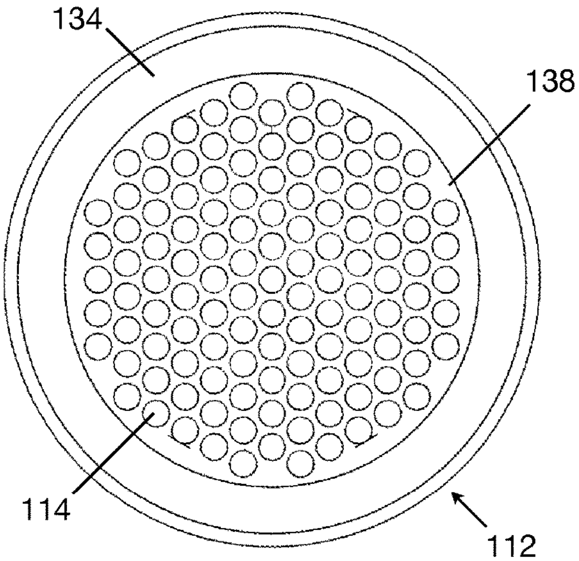
FIG. 14 is a top view of the insert of FIG. 9 with a coarse mesh with circular holes.
Figure 15:
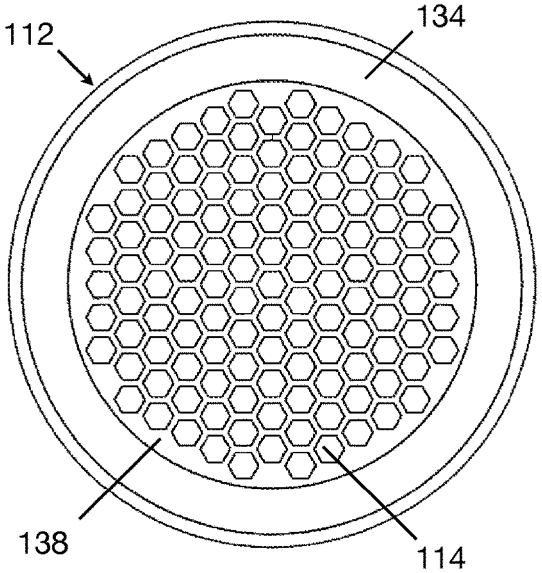
FIG. 15 is a top view of the insert of FIG. 9 with a coarse mesh with hexagonal holes.

This pocket-sized configuration offers a significant improvement because the device can be carried discretely to wherever a person might use a bathroom, whether at home or away, private or public, in a facility with full plumbing or a portable potty with no water. As best depicted in FIG. 9, the device may be a circular prism with rounded edges that has a preferred diameter of 7.5 cm and depth of 2.0 cm to balance portability with liquid storage, though the dimensions may vary substantially and still allow the device to be both discrete and portable, and to fit in the pockets, fanny packs, and purses which a human being might typically wear or carry, all of which sizes are herein encompassed by the term "pocket-sized". It may be effective at 5 cm×5 cm×1 cm or other sizes smaller than the preferred size, and in larger sizes, as depicted in FIG. 6, and in a substantial variety of geometric shapes, including rectangular prism 140, circular prism (cylinder) 110, and elliptical, with other shapes contemplated. Sizes close to the preferred size are all equally effective, with variations enhancing the portability or liquid storage capacity of the device as preferred by the manufacturer.

This pocket-sized configuration with the sponge offers a significant improvement because it enables the customer to add and dispense small amounts of liquids in addition to tap water for purposes that may suit their personal needs and may extend beyond cleaning. For example, witch hazel, rose water, or distilled water may be intermittently used for their therapeutic properties, as may any other liquid suitable to apply to the skin in affected regions of the body. They will transfer from the sponge 118, 128 onto the paper, without any extra steps, each time the paper is pressed into the device, and may then be directly applied to the body.

The device's configuration with a sponge as the storage offers the customer an advantage because the liquid content naturally disperses substantially equally throughout the material, enabling commensurately equal transfer of the liquid to paper without additional dispersal mechanism. The device's configuration with a sponge as both the storage and dispensing mechanism offers the customer an advantage because it obviates the need for an additional liquid storage component and thus may further enable the device to be pocket-sized and transportable.

The sponge 118, 128 that stores and dispenses the liquid may take a substantial number of forms. The material may be any flexible, absorbent, porous material that may be an actual natural sponge from the ocean (a primitive sedentary aquatic invertebrate with a soft porous body that is typically supported by a framework of fibers or calcareous or glassy spicules) or may be a synthetic sponge or cloth or layered cloth or permeable material, separate or in combination, made of materials such as cellulose, bamboo, cotton, or polyester in whole or part with other such materials contemplated, with the defining characteristics of being flexible, porous, absorbent, capable of releasing absorbed liquid when pressed, and substantially returning to its original relaxed size, shape, and structure when released (unpressed). All such forms of the material are referred to for convenience by the term "sponge". For reasons of reliable performance, longevity, and environmental responsibility, the preferred embodiment of a sponge 118, 128 is one made of cellulose fibers.

This device's configuration with the sponge 118, 128 that is effective when moist and unsaturated offers a significant improvement because the material affords the customer fine control over the amount of liquid transferred to the paper 102 in a given time unit or with any given press of the paper onto the sponge, without which control, for example with paper dipped directly into a pool of water or placed into a stream of water such as from a faucet or pressed onto a saturated material, the paper may rapidly absorb excess liquid and become saturated and soggy, where such excess liquid may render the paper unable to be transformed into the dense structure or unable to form and retain the effective texture that is enabled by the present device. Only a small amount of liquid may be required for formation of texture and for effective cleaning, with 7.5 ml (approximately ½ tablespoon)±25% being sufficient and preferred for most applications, providing the feel and cleansing benefit of moisture without leaving the skin being wiped or the fingers holding the paper wet and in need of drying, though more liquid may be helpful with more dispersed, dried, or stubborn residue, while substantially less water may leave the paper undifferentiated from the paper in its original dry form 102. With this configuration, the customer is able to control, in real time and in response to the anticipated nature and location of the residue needing cleaning, the amount of liquid and pressure transforming the paper by the force with which they press and the length of time they press against the coarse mesh which presses onto the sponge, simultaneously texturizing, densifying, and wetting the paper.

Figure 16:
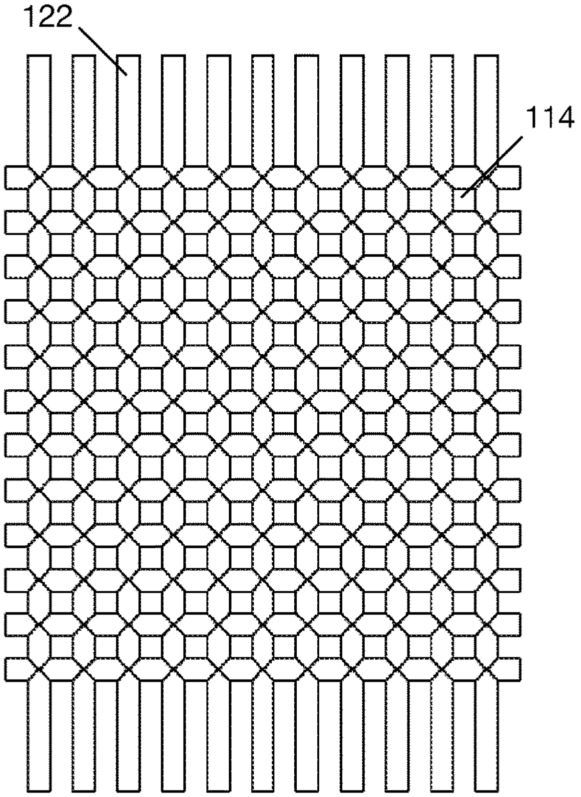
FIG. 16 is a top view of the coarse mesh of FIG. 6 with rectangular holes.
Figure 17:
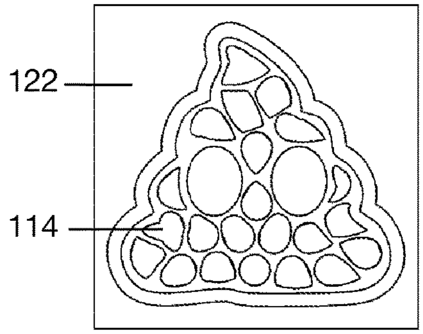
FIG. 17 is a top view of the coarse mesh of FIG. 6 with holes of varied shapes and sizes.
Figure 18:
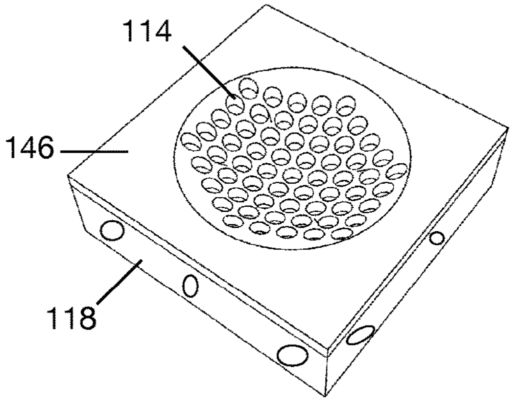
FIG. 18 is a front perspective view of a contoured coarse mesh and sponge.

The device's configuration with a coarse mesh mold 138, 122, 124 offers a significant improvement because the coarse mesh mold enables the real time formation of dense texture 106 in the transformed paper 104. The term "mesh" defines a material made of a network of interlaced strands of a base material, such as wire, thread, or extruded silicone or plastic; or a material made of a sheet, such as plastic, silicone, urethane, fiberglass, carbon fiber reinforced polymer, or metal, but including many other materials, and which may be of non-uniform thickness and may include a plurality of high areas and low areas, with a field of thru-holes of any geometric shape imparted by typical means (drilling or punching, for example, including with metal, lasers, water jets, and others) or as part of the process of forming the sheet (injection molding or 3D printing, for example); or a layering of a plurality of such materials; with other such materials also contemplated. A mesh has thru-holes (or "holes") 114, such holes including the volume of any contiguous concave or elevated area on the top of the mesh as part of the hole, that allow passage of liquid from one end through to the other and a material (or webbing) which forms and separates the holes, each with their own sizes. The holes may have a top area nearest to the mass of the paper wider or narrower than the bottom area nearest to the sponge, such as to mold a tapered or stepped texture, or may be substantially uniform throughout the depth of the hole, such as to mold a prismatic texture, and may have chamfered, rounded, notched, or other edges on each or either end. Such holes may be organized into a grid pattern, as depicted in FIG. 16, or any other pattern—including patterns that form a specific design—and may be circular, hexagonal, rectangular, or any other shape, as depicted in FIGS. 14, 15, 16, and 17 respectively as preferred by the manufacturer.

Holes in the mesh mold that are small, where no planar slice of the hole parallel to the horizontal plane has a dimension between any two points along the perimeter greater than or equal to 2.0 mm, form a "small mesh" that may prevent the insertion of a sufficient mass of paper into the mold of the mesh to form a substantial textural "nub" 106, or the shaped, densified, wetted paper that projects outward from the surface of the compressed paper 104, which density is enhanced by being forced with pressure against the compressed sponge, and which significantly enables cleaning of residue. A mesh mold that is thin from top to bottom (<1.0 mm on average, whether in its relaxed state or when the force to compress the sponge is applied) forms a "thin mesh" without deep, substantial nubs. Holes in the mesh that are distant from adjacent holes, such that there may be less than 5% hole versus webbing by area, for example a solitary 2 mm×2 mm hole in a 1 cm×1 cm area, form a "sparse mesh" that may have insufficient concentration of nubs to comprehensively clean residue. As this relates to common items, a typical window screen or wire kitchen sieve is a mesh that is too small and too thin to mold substantial nubs and by extension a substantial texture such as enabled by the present device. A typical metal kitchen colander may have larger holes, but is generally too thin and with holes that may be too sparse, and may also not create substantial texture nor enough of it. Thus, a mesh that is too fine, or a "fine mesh"—whether from small hole size or lack of depth or low concentration of holes, i.e., a small mesh or a thin mesh or a sparse mesh—may create an insufficient transformation of the paper for the most effective cleaning; the paper may be wet and may even be dense, but without sufficient texture provided by substantial, densified, and differentiated nubs 106 it may smear residue on the skin rather than remove it.

Therefore, a "coarse mesh" 122, 124, 138 would define a mesh that is not a fine mesh, and that, whether rigid or flexible, must be able to be repeatedly pressed a multitude of times with even or uneven pressure from the paper onto the sponge and causing substantial compression of the sponge, and even to the fully compressed depth of the sponge though less may also be effective, without tearing, breaking or permanently deforming either the mesh or the sponge. The coarse mesh 122, 124, 138 being in proximity to the sponge 118, 128 or integral to the sponge, and pressed directly against the sponge by the paper, offers a significant improvement because the combination of liquid, the sponge 118, 128, the coarse mesh mold 122, 124, 138, and the applied force of pressing causes the paper to fill the holes 114 in the coarse mesh as though it were a mold, with the walls of each hole forming the sides of the mold and the compressed sponge forming the bottom of the mold and enabling delivery of variable volumes of liquid with variable applied force, shaping the wetted paper in real time into a compressed and densified three-dimensional structure and thusly transforming dry sheets of paper 100, 102 into a textured, densified, wetted body 104 with a substantially nub-covered 106 surface whose denseness and sturdiness is more able to hold its transformed shape, and thus less prone to flattening or tearing when wiped across the skin and body hairs, than paper which is dry or merely wetted or soggy. The size and spacing of the nubs 106 influences the effectiveness of the transformed paper, as it is the unoccupied spaces between nubs that primarily collect the residue and minimize smearing as residue is being wiped from the surfaces. In the preferred configuration, the nubs 106 from the mold formed by the coarse mesh 122, 124, 138 and compressed sponge 120, 130 will be between 3 mm and 5 mm in width or diameter, generally be spaced between 1 mm and 2 mm on average from adjacent nubs for differentiation without excess voided area that may smear more than clean, and project at least 2 mm from the surface of the paper.

Holes 114 in the field of the mesh 122, 124, 138 need not be uniform in width or depth. While one fine-mesh hole (whether from small size or depth or both) in a field of coarse holes coincident with the opening in the container may not appreciable reduce the cleaning effectiveness of the transformed paper, and one coarse hole in a field of fine-mesh holes may not appreciably increase the cleaning effectiveness, a mesh with a plurality of coarse holes where any three cm diameter circle on the field overlaps one or more coarse holes such that the aggregated area of all the overlapped holes, coarse and fine, measured using the volume of each such hole divided by its average depth, is five percent or greater of the area of the circle may perform substantially as a mesh comprised of all coarse openings, and is thus considered a coarse mesh. While a fine mesh results in insufficient texture, a coarse mesh 122, 124, 138, serving with the sponge as a mold for the paper 102, and in concert with other elements of the device, enables real-time transformation of the paper into a textured, densified, and wetted form 104 with a multiplicity of substantial and differentiated nubs 106 providing an abundance of raised areas and edges that are suited to the task of cleaning residue from the skin and body hairs of a human being and from the fixtures the humans may encounter in a public or private bathroom.

This configuration with the coarse mesh 122, 124, 138 and the sponge 118, 128 fitting snugly in the container 110, 140, 154 with minimal empty space, defining the term "encased", facilitates that liquid being released from the compressed sponge 118, 128 to transfer directly through the mesh into the paper 102 rather than dispersed out the bottom and sides of the sponge, benefitting the customer by giving them greater control over the amount of liquid transferred to the paper as needed for the task at hand.

In the preferred use, the container 110, 140 encasing the sponge and mesh may be waterproof and rigid or semi-rigid to provide stability when pressing onto the mesh. It may be made of any material compatible with the liquid or liquids added to the sponge, including, for example, silicone, urethane, high density polyethylene (HDPE) and other plastics, glass, fiberglass, stainless steel, copper, ceramic, carbon fiber reinforced polymer, and many others. The rigidity means the container 110, 140 will not substantially deform when paper 102 is pressed against the contained coarse mesh 122, 124 and sponge 118, 128. The container 140 of any configuration may optionally be wrapped in a label that provides product identification or usage instructions or ornamentation 144.

In an alternate configuration, the container encasing the sponge and mesh may be waterproof and flexible 154. It may be made of any flexible material that is compatible with the liquids added to the sponge, including, for example, soft silicones, urethanes, and plastics (low-density polyethylene, pvc, etc), rubber, BoPET (Biaxially-oriented polyethylene terephthalate, aka Mylar), neoprene, and others. Rigidity to stabilize the device and enable it to not substantially deform when paper 102 is pressed against the contained mesh 138 and sponge 118 may be achieved by inserting a rigid or semi-rigid plate within the container and beneath the sponge, or by encasing the container in a rigid or semi-rigid case 156 which has a compatible top opening 158 and which need not be waterproof and may be in multiple parts. The flexible container 154 may deform sufficiently to be inserted into such a case through just the top opening, if said case is a single piece. Such case could be made of metal, bamboo, wood, cork, ceramic, glass, silicone, plastic, stiffened leather, with other materials also contemplated.

The opening 150 of the container 110, 140, 154 should be of sufficient size to fit fingers holding crumpled paper 102, 5 cm to 7 cm in diameter being preferred, with the advantage to the customer of being a single location where liquid is added and paper is pressed without the customer having to manipulate or disassemble the device. The preferred shape is round, but with no inherent benefit over other shapes that allow insertion and withdrawal of the paper. In the preferred case where the sponge is not saturated, the liquid will be wholly contained in the sponge and not spill from the container—whether the container is upright, on a side, or upside down—to aid in transportability, and the device may be used in any of these positions without lessened effectiveness. A lid 152 may be fitted to the opening to minimize evaporation of the liquid and unintended transfer of liquid from the device if the sponge is contacted by the other contents of a purse or pocket, for example, or other foreign object.

In the preferred embodiment, the sponge 118 may have a concave area 132 along its top surface corresponding to the location of the opening 150 in the container 110, 154. The concavity may provide space for the liquid to be added to the sponge 118 without overflowing the container. The concavity may also allow easier compression of the paper, with less thickness of sponge to press through to impart density to the paper when applying force against the sponge and bottom of the container. As an alternative, the top surface of the sponge may be planar 128 or even convex, where the opening 150 of the container 140 having a raised and/or recessed lip 142 may facilitate adding liquid.

Figure 2:
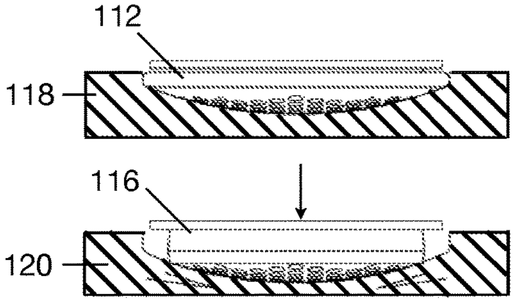
FIG. 2 is a front cut-away view of the inner components of the device of FIG. 1 in its relaxed state and when pressed by a human hand with paper.
Figure 3:
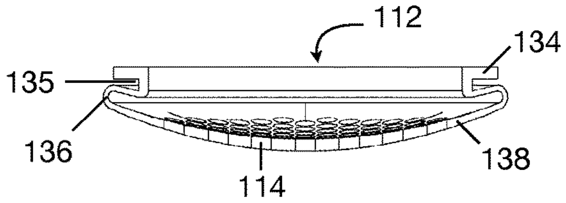
FIG. 3 is a front cross section view of the insert of the device of FIG. 1.

In the preferred embodiment, the coarse mesh 138 may be provided by an insert 112 that snaps or fits securely into the opening 150 of the container 110, 154. The insert 112 may be a single unit of a flexible material (such as silicone, urethane, a thermoplastic, or a styrene-based copolymer, but other similarly durable and flexible material is also contemplated), and have a lip 134, a groove 135, and one or more curved 136 or angular accordion-like folds that transition to form a field for the holes in the coarse mesh 138 along the bottom of the insert, coincident with the concavity 132 of the sponge 118, though may also be more than one piece, such as a lower part with walls that slide along the walls of the upper part. In an alternative configuration, the side walls of the insert may be of an elastic material (such as silicone or a styrene-based copolymer, with other similarly elastic materials also contemplated) connected to the upper and lower parts of the insert via overmolding or insert molding, for example, to allow the mesh to be pressed onto the sponge by repeatedly stretching and relaxing. In an alternative configuration, the coarse mesh may be of a different material than the upper part of the insert, such as a rigid plastic, urethane, or silicone that may be connected to the top of the insert via overmolding or insert molding, for example. The insert 112, the container 154, or both would temporarily deform sufficient for the insert 112 to fit through the opening 150 as part of the manufacturing process with the lip 134 on the outside of the container, the groove 135 within the opening, and the body 136, 138 of the insert within the container 110, 154. The insert 112 may be kept in place within the opening 150 by the combined pressure of being pinched between the lip 134 and folds 136 or other ridge or stop, by adhesive, by heat sealing, or other means, and may be removable and replaceable. When the customer presses the paper 102 into the opening 150 of the container 110, 154, the bottom 116, 138 of the insert 112 extends down onto and compresses the sponge 118, the liquid releases through the holes 114 in the coarse mesh 138 portion of the insert 112 into the paper 102, which is simultaneously pressed into the mold formed by the holes of the coarse mesh against the sponge, forming the nubs, and the insert returns to its relaxed state when the customer removes the paper, which relaxed and extended state of the insert is depicted in FIG. 2.

Figure 4:
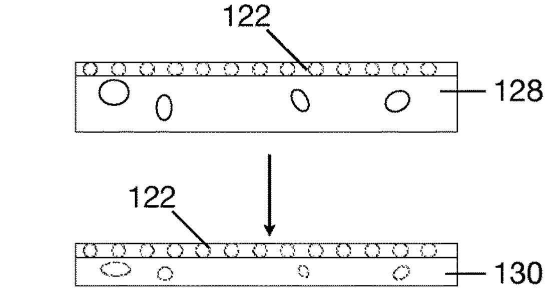
FIG. 4 is a front view of the inner components of the device of FIG. 6 configured with a rigid mesh mat in its relaxed state and when pressed by a human hand with paper.
Figure 5:
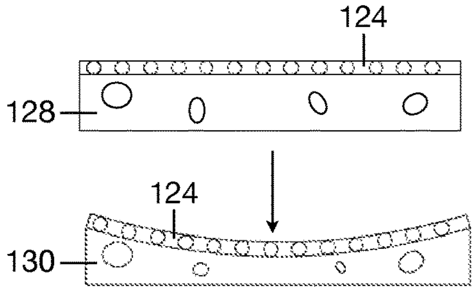
FIG. 5 is a front view of the inner components of the device of FIG. 6 configured with a flexible or semi-rigid mesh mat in its relaxed state and when pressed by a human hand with paper.

In the alternative configuration, the coarse mesh mold may be a mat 122, 146 comprising a coarse mesh that rests on the sponge 128 and may be compatible with the contour of the sponge. The mat may be independent of the sponge, may be laminated to the sponge by adhesive bonding, stitching, melt bonding, ultrasonic welding or other method, or may be molded as one piece with the sponge. Whether the mat is of a rigid 122 or flexible 124 material, and independent, laminated, or integral, it can be pressed onto the sponge 130, as depicted in FIGS. 4, 5, to release liquid into and provide density and texture 106 onto the paper 104.

In the preferred configuration, the insert 112 or mat 122, 146 and the sponge 118, 128 may be removable and replaceable by the user for reasons of whim, aesthetic preferences, alternate mesh patterns, cleaning, or other reason.

Figure 19:
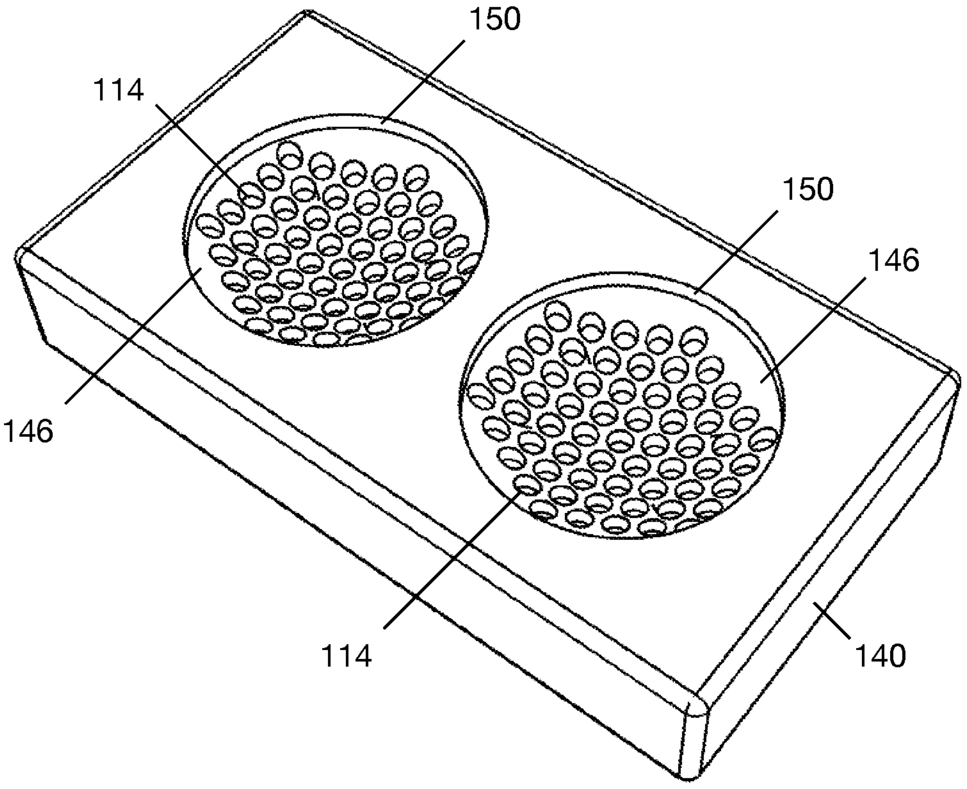
FIG. 19 is a front perspective view of the pocket-sized paper-transforming device with a plurality of openings.

In the preferred use, the container has a single opening 150. In an alternative use, as depicted in FIG. 19, the container may have multiple openings in the top and one or more interior transverse walls to divide the container into the multiple compartments, each with its own sponge and mesh. Such a configuration would allow the customer to have multiple separate liquids at hand, such as water for cleaning and witch hazel for therapeutic purposes, with the container still being pocket-sized and retaining its other properties.

What is claimed is:

1. A pocket-sized device for transforming paper in real time, comprising:

- a sponge that absorbs and retains liquid, releases liquid when pressed, and resumes its relaxed state when not pressed;
- a mat that is a coarse mesh mold with holes resting on top of or in close proximity to top of said sponge that can repeatedly be pressed downward with paper onto and compress said sponge with applied force sufficient to release liquid to wet and compress paper, such that a mass of paper is introduced into the holes of said coarse mesh mold and against said compressed sponge to form substantial densified textural nubs of the paper, and substantially return to its relaxed position when not pressed; and, a pocket-sized waterproof container that encases said sponge and said mat, with a top opening through which to intermittently add liquid to said sponge and press paper.

2. The device of claim 1, further comprising a concave depression in the top of said sponge corresponding to the top opening of said container, providing a cavity into which to add liquid and press paper.

3. The device of claim 2, wherein said mat is concave coincident with the concavity of said sponge.

4. The device of claim 1, wherein said mat is laminated to said sponge.

5. The device of claim 1, wherein said mat is formed as a single integrated, inseparable unit with said sponge.

6. The device of claim 1, further comprising a vertical lip extending around the perimeter of the opening in said container to provide a cavity into which to add liquid and press paper.

7. The device of claim 1, further comprising a rigid or semi-rigid plate beneath said sponge within said container.

8. The device of claim 1, further comprising an outer case of one or more pieces encasing said waterproof container with a top opening coincident with the top opening of said waterproof container.

9. The device of claim 1, wherein the device may be stored and used while oriented in any position or direction without spilling liquid.

10. The device of claim 1, wherein the components are user removable and replaceable.

11. The device of claim 1, further comprising the container being segmented into compartments by one or more transverse walls, each such compartment having said sponge, coarse mesh mold, and opening.

12. A pocket-sized device for transforming paper in real time, comprising:

a sponge that absorbs and retains liquid, releases liquid when pressed, and resumes its relaxed state when not pressed;

a pocket-sized waterproof container that encases said sponge, with a top opening through which to intermittently add liquid to said sponge and press paper;

a concave depression in the top of said sponge corresponding to the top opening of said container that provides a cavity into which to add liquid and press paper; and an insert that extends through and secures in the opening of said container with a bottom wall in proximity to the contours of the top of said sponge that forms a coarse mesh mold with holes, said insert which can repeatedly be pressed downward with paper onto and compress said sponge with applied force sufficient to release liquid to wet and compress paper, such that a mass of paper is introduced into the holes of said coarse mesh mold and against said compressed sponge to form substantial densified textural nubs of the paper, and substantially return to its relaxed position when not pressed.

13. The device of claim 12, wherein the insert may contain a section of material that folds onto itself in the relaxed position and unfolds to extend when the insert is pressed onto the sponge.

14. The device of claim 12, wherein the insert may contain a band of material that is elastic and stretches to extend when the insert is pressed onto the sponge, and resumes its relaxed position when not pressed.

15. The device of claim 12, further comprising a rigid or semi-rigid plate beneath said sponge within said container.

16. The device of claim 12, further comprising an outer case of one or more pieces encasing said waterproof container with a top opening coincident with the top opening of said waterproof container.

17. The device of claim 12, wherein the device may be stored and used while oriented in any position or direction without spilling liquid.

18. The device of claim 12, wherein the components are user removable and replaceable.

19. The device of claim 12, further comprising the container being segmented into compartments by one or more transverse walls, each such compartment having said sponge, coarse mesh mold, and opening.

* * * * *